(12) United States Patent
Kurz

(10) Patent No.: US 10,271,335 B2
(45) Date of Patent: Apr. 23, 2019

(54) METHOD FOR ROUTING IN A COMMUNICATION NETWORK, COMMUNICATION NETWORK, PROGRAM AND COMPUTER PROGRAM PRODUCT

(71) Applicant: Deutsche Telekom AG, Bonn (DE)

(72) Inventor: Michael Kurz, Vienna (AT)

(73) Assignee: DEUTSCHE TELEKOM AG, Bonn (DE)

(*) Notice: Subject to any disclaimer, the term of this patent is extended or adjusted under 35 U.S.C. 154(b) by 38 days.

(21) Appl. No.: 15/694,851

(22) Filed: Sep. 4, 2017

(65) Prior Publication Data

US 2018/0077713 A1   Mar. 15, 2018

(30) Foreign Application Priority Data

Sep. 14, 2016   (EP) .................................. 16188810

(51) Int. Cl.
*H04W 72/04* (2009.01)
*H04L 12/721* (2013.01)
*H04L 12/911* (2013.01)
*H04L 12/26* (2006.01)

(52) U.S. Cl.
CPC ....... *H04W 72/0493* (2013.01); *H04L 45/123* (2013.01); *H04L 47/822* (2013.01); *H04L 43/08* (2013.01)

(58) Field of Classification Search
CPC ..... H04L 43/08; H04L 45/123; H04L 47/822; H04W 72/0493
See application file for complete search history.

(56) References Cited

U.S. PATENT DOCUMENTS

| | | | |
|---|---|---|---|
| 6,775,280 B1* | 8/2004 | Ma | H04L 45/00 370/230 |
| 8,428,072 B2* | 4/2013 | Mariblanca Nieves | H04L 45/123 370/392 |
| 8,995,301 B1* | 3/2015 | Miller | H04L 45/00 370/254 |
| 9,219,679 B2* | 12/2015 | Miller | H04L 45/00 |
| 9,258,212 B2* | 2/2016 | Pfeifer | H04L 45/124 |
| 2005/0240466 A1* | 10/2005 | Duggirala | G06Q 10/06315 705/7.25 |
| 2007/0041326 A1* | 2/2007 | Babiarz | H04L 41/5022 370/237 |
| 2011/0069713 A1* | 3/2011 | Mariblanca Nieves | H04L 45/00 370/400 |
| 2012/0155264 A1 | 6/2012 | Sharma et al. | |
| 2013/0303114 A1 | 11/2013 | Ahmad et al. | |
| 2015/0334039 A1 | 11/2015 | Crowell et al. | |

(Continued)

*Primary Examiner* — Steven H Nguyen
(74) *Attorney, Agent, or Firm* — Leydig, Voit & Mayer, LTD.

(57) ABSTRACT

A method for routing in a communication network includes: in a first step, providing a template data set including a routing cost indication for a first second-slice resource to a control unit; and in a second step, subsequent to the first step, determining if the routing cost indication of the first second-slice resource complies with a predefined routing requirement of a second network slice, and, if the routing cost indication of the first second-slice resource is found to be non-compliant, determining a first-slice resource and routing network traffic from a second second-slice resource via the first-slice resource to a third second-slice resource.

9 Claims, 3 Drawing Sheets

(56) References Cited

U.S. PATENT DOCUMENTS

2017/0026273 A1* 1/2017 Yao .................. H04L 45/02
2018/0213461 A1* 7/2018 Grayson ............ H04W 40/04

* cited by examiner

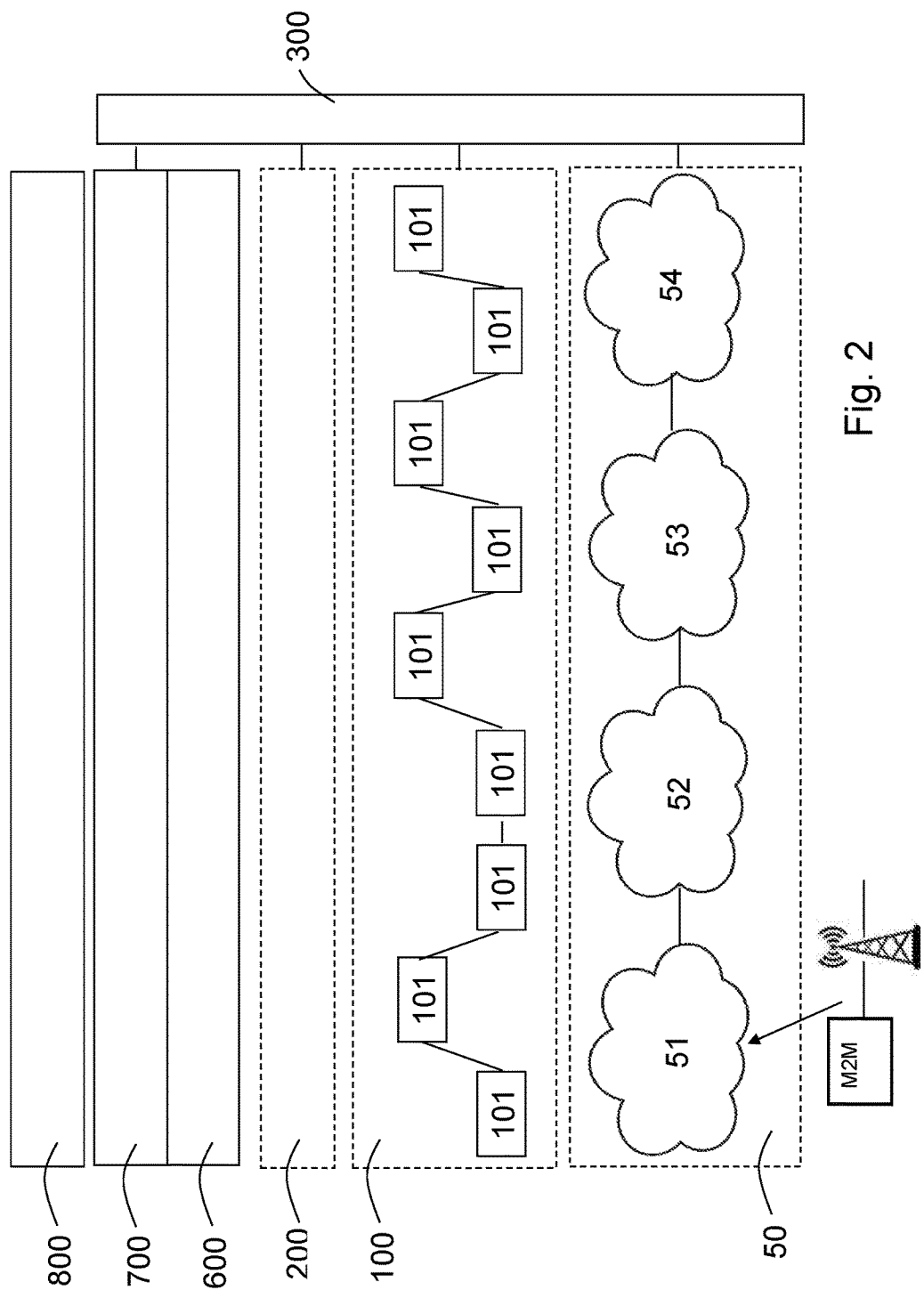

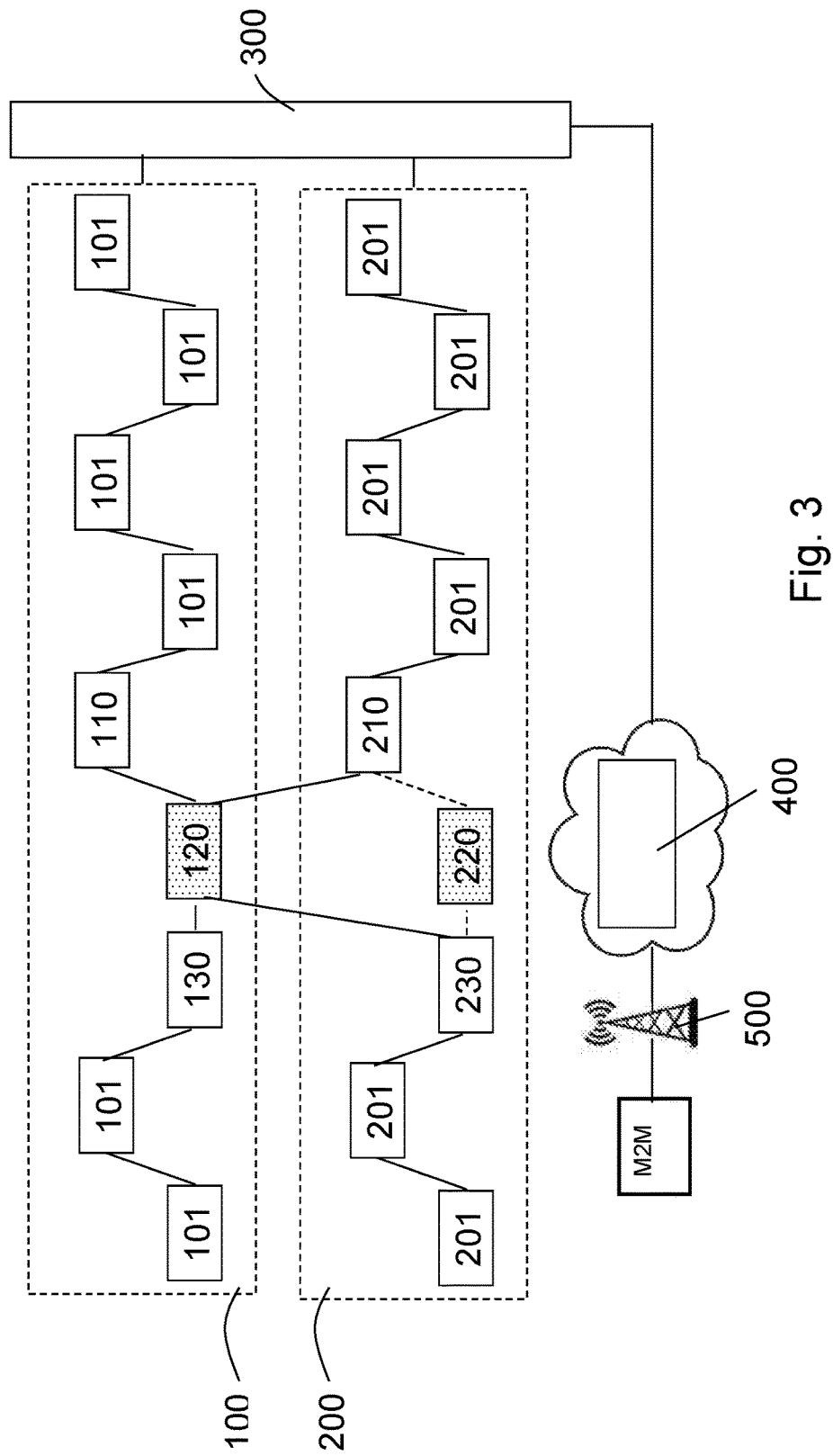

METHOD FOR ROUTING IN A COMMUNICATION NETWORK, COMMUNICATION NETWORK, PROGRAM AND COMPUTER PROGRAM PRODUCT

CROSS-REFERENCE TO RELATED APPLICATIONS

Priority is claimed to European Patent Application No. EP 16 188 810.2, filed on Sep. 14, 2016, the entire disclosure of which is hereby incorporated by reference herein.

FIELD

The present invention relates to a method for routing in a communication network including a first network slice, wherein the first network slice comprises multiple first-slice resources, and a second network slice, wherein the second network slice comprises multiple second-slice resources.

Further, the invention relates to a communication network including a first network slice, wherein the first network slice comprises multiple first-slice resources, and a second network slice, wherein the second network slice comprises multiple second-slice resources.

BACKGROUND

Currently installed communication networks use rather monolithic architectures to serve the diverse and in some cases extreme requirements of different uses of those networks, e.g. mobile communication using smart phone, transmission of over-the-top (OTT) content, and machine-to-machine (M2M) communication. In order to provide higher flexibility and scalability in future communication networks (5G) it is considered to divide the network into multiple network slices each having dedicated characteristics tailored to a specific use case. For example a dedicated network slice with very low latency may be included in the communication network to allow improved M2M communication whereas other critical business services will use a network slice provided with very high reliability. Other network slices will provide high throughput or support high mobility of its users.

In such communication networks each network slice comprises a plurality of resources dedicated to the network slice and configured to meet the demands of the intended use case.

SUMMARY

In an exemplary embodiment, the present invention provides a method for routing in a communication network. The communication network includes: a) a first network slice, wherein the first network slice comprises multiple first-slice resources; b) a second network slice, wherein the second network slice comprises multiple second-slice resources; and c) a control unit for controlling data flow in the first network slice, in the second network slice and between the first network slice and the second network slice. The method includes the following steps: in a first step, providing a template data set including a routing cost indication for a first second-slice resource to the control unit; and in a second step, subsequent to the first step, determining if the routing cost indication of the first second-slice resource complies with a predefined routing requirement of the second network slice, and, if the routing cost indication of the first second-slice resource is found to be non-compliant, determining a first-slice resource and routing network traffic from a second second-slice resource via the first-slice resource to a third second-slice resource.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 schematically illustrates a communication network including two network slices and a control unit.

FIG. 3 schematically illustrates a section of the communication network of FIG. 2.

DETAILED DESCRIPTION

Figure 1:
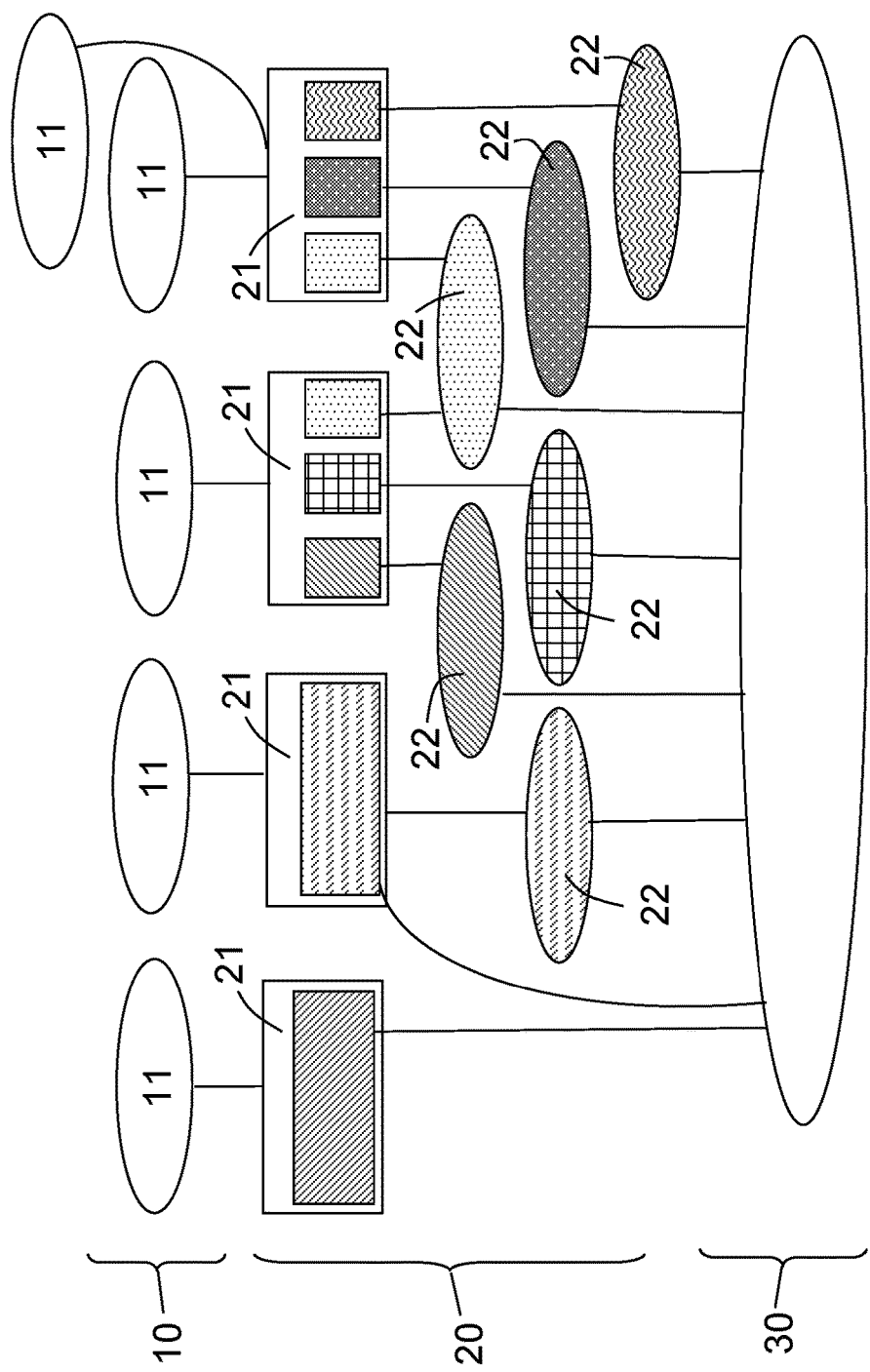
FIG. 1 schematically illustrates a layer stack of a mobile communication network that implements network slicing.

In light of the above considerations, exemplary embodiments of the present invention improve routing performance in communication networks comprising multiple network slices.

In an exemplary embodiment, the present invention provides a method for routing in a communication network including:

a) a first network slice, wherein the first network slice comprises multiple first-slice resources,
b) a second network slice, wherein the second network slice comprises multiple second-slice resources, and
c) a control unit for controlling data flow in the first network slice, in the second network slice and between the first network slice and the second network slice, wherein the method comprises the following steps:

in a first step, a template data set including a routing cost indication for a first second-slice resource is provided to the control unit, in a second step, subsequent to the first step, it is determined if the routing cost indication of the first second-slice resource complies with a predefined routing requirement of the second network slice, and, if the routing cost indication of the first second-slice resource is found to be non-compliant a first-slice resource is determined and network traffic is routed from a second second-slice resource via the first-slice resource to a third second-slice resource.

According to the present invention the template data set provided to the control unit includes an indication of the routing costs when routing network traffic via the first second-slice resource. The routing cost indication can be used to check whether the predefined routing requirement of the respective network slice can be met in case a route via the first second-slice resource is chosen. In case the routing cost indication does not satisfy the predefined routing requirement, a first-slice resource is determined, the first-slice resource being capable of serving as a detour around the first second-slice resource. Then, network traffic is routed from a second second-slice resource via the first-slice resource to a third second-slice resource. It is thereby possible to enhance routing performance between resources of the second network slice.

According to the present invention, a first-slice resource and/or a second-slice resource may be implemented as a network function or a physical resource implementing a network function or a logical resource implementing a network function.

According to the present invention it is preferred that the second step is executed by the control unit of the communication network.

The control unit preferably has access to the information which resources are included in each of the network slices and what capabilities they have. The control unit may determine a first-slice resource as detour or replacement for the first second-slice resource which has similar, preferably identical, capabilities.

According to a preferred embodiment of the present invention, the routing cost indication is one of a load indication, a congestion indication, a drop rate indication, a latency indication, a bandwidth indication or a maximum transmission unit indication. Alternatively, the routing cost indication may be a combination of two or more of a load indication, a congestion indication, a drop rate indication, a latency indication, a bandwidth indication or a maximum transmission unit indication.

Dependent on the use case the second network slice is adapted to and dependent on the respective routing requirement of the second network slice an appropriate routing cost indication is chosen. The routing requirement may be a routing metric that is a function of one or more values comprising a load indication, a congestion indication, a drop rate indication, a latency indication, a bandwidth indication and a maximum transmission unit indication.

According to a preferred embodiment of the present invention, the routing cost indication is determined by measurements prior to the first step. Preferably, the measurements result in statistical values that allow deriving a routing cost indication for the first second-slice resource. Advantageously, the measurements are carried out for a given period of time, in particular for a period of less than a week, preferably less than a day, more preferably less than an hour, even more preferably less than a minute, even more preferably less than a second.

Thereby, it is advantageously possible to make use of measurement data of previous traffic conditions of the communication network in order to enhance the routing performance of the communication network.

According to a preferred embodiment of the present invention, the provided routing cost indication is provided as a function of the date and/or as a function of the day time.

By providing a temporary dependent routing cost indication it is possible to take into account measurement data of specific historic events which might, at least similarly, happen again. For example a high traffic situation may have been measured for New Year's Eve of a specific year. By providing the routing cost indication as a function of date and day time it is possible to use the measurements in order to enhance routing at New Year's Eve one or several years later.

According to an alternate preferred embodiment of the present invention, in the first step, a date indication and/or daytime indication is provided to the control unit in addition to the routing cost indication. Preferably, the date indication and/or daytime indication relate to the date or daytime the routing cost indication is associated with.

Thereby, it is advantageously possible to account for the provided date indication and/or daytime indication in the second step of the inventive method in order to allow for temporary dependent determination if the routing cost indication complies with the routing requirements of the second network slice.

According to a preferred embodiment of the present invention, the routing cost indication is provided by a mobile edge cloud server arranged at a base station of the communication network or in proximity of a base station of the communication network.

By using the mobile edge cloud server unnecessary traffic on the communication network may be avoided.

According to a preferred embodiment of the present invention, in the first step, the template data set is further provided with a first-slice resource indication and, in the second step, the first-slice resource indication is employed to determine the first-slice resource as detour for the first second-slice resource.

Providing an indication which first-slice resource may be used as detour for the first second-slice resource simplifies determination of the first slice resource. In particular, a plurality of first-slice resources may be indicated in the template data set and, in the second step, a first-slice resource is selected from the indicated first-slice resources.

According to a preferred embodiment of the present invention, the first-slice resources of the first network slice and/or the second-slice resources of the second network slice are servers, preferably general-purpose serves, or switches, preferably software-defined network switches.

Furthermore, the present invention relates to a communication network including:
a) a first network slice, wherein the first network slice comprises multiple first-slice resources,
b) a second network slice, wherein the second network slice comprises multiple second-slice resources, and
c) a control unit for controlling data flow in the first network slice, in the second network slice and between the first network slice and the second network slice,
wherein the communication network is configured to execute the following steps:
   in a first step, a template data set including a routing cost indication for at least a first resource of the second network slice is provided to the control unit,
   in a second step, subsequent to the first step, it is determined if the routing cost indication of the first resource of the second network slice complies with a predefined routing requirement of the second network slice, and, if the at least one resource is found to be non-compliant a first-slice resource is determined and network traffic is routed from a second second-slice resource via the first-slice resource to a third second-slice resource.

Additionally, the present invention relates to a program comprising a computer readable program code which, when executed on a server and/or on a control unit of a communication network or in part on a server and in part on a control unit, causes the server and/or the control unit to perform the inventive method.

Still additionally, the present invention relates to computer program product for improved communication between resources of one or more network slices of a communication network, the computer program product comprising a computer program stored on a storage medium, the computer program comprising program code which, when executed on a server and/or on a control unit of a communication network or in part on a server and in part on a control unit, causes the server and/or the control unit to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to a particular embodiment and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, an overview on the concept of network slicing is provided. The layer stack comprises a service layer 10, a network slice layer 20 and a resource layer 30.

The service layer 10 comprises a plurality of services 11 the communication network is supporting. Those services 11 may comprise end-user services and/or business services. The services 11 may either be provided by the operator of the communication network or by a third party.

In the network slice layer 20 a plurality of network slices 21 is provided, each tailored to a specific use case that is requested by one of the services 11. The network slices 21 can either be dedicated to exactly one service 11 but may also be shared across multiple services 11. The network slices 21 may comprise sub-networks 22 that may optionally be shared by multiple network slices 21.

The resource layer 30 includes a pool of resources. Those resources may be implemented as a network function or a physical resource implementing a network function or a logical resource implementing a network function. In particular, the resources may be servers, preferably general-purpose serves, or switches, preferably software-defined network switches.

In FIG. 2, a communication network including a first network slice 100 and a second network slice 200 is illustrated. As apparent from FIG. 2, the first network slice comprises a plurality of resources 101, further referred to as first-slice resources. Even though not depicted for the sake of simplicity the second network slice 200 also comprises a plurality of resources, in the following referred to as second-slice resources. Those first-slice resources 101 and/or second-slice resources may be implemented as a network function or a physical resource implementing a network function or a logical resource implementing a network function. Preferably, the first-slice resources 101 and/or second-slice resources are servers, more preferably general-purpose serves. Alternatively, the first-slice resources 101 and/or second-slice resources may be implemented as switches, preferably software-defined network switches. The communication network further includes a control unit 300 implemented as an orchestration management unit. Using the control unit 300 data flow in the first network slice 100 and in the second network slice 200 is controlled.

The network slices 100, 200 of the communication network are configured to run services that have different requirements for latency, throughput, mobility and reliability. For example, the network slices 100, 200 may be adapted for mobile broadband services or massive internet of things (IoT) or M2M communication or ultra-low latency service or dense broadband service. The network slices 100, 200 are created and deployed over a distributed cloud and virtualized infrastructure, each with unique capabilities dedicated to a supported service.

The communication network further includes an application layer 800, a service layer 700, a control layer 600 and an infrastructure layer 50. The infrastructure layer 50 includes a device cloud 51, a mobile edge cloud 52, a network cloud 53, and an application cloud 54.

The mobile edge cloud 52 comprises mobile edge computing (MEC) servers spatially located at the edge of the radio access network (RAN). In other words, the mobile edge computing servers are located near a base station or at a base station of the mobile communication network. Those mobile edge computing servers allow providing cloud computing capabilities and/or an IT service environment at the edge of the radio access network.

In FIG. 3, an embodiment of the inventive communication network is depicted. In the following, an embodiment of the inventive method will be described by reference to FIG. 3.

The communication network includes a first network slice 100 and a second network slice 200. The first network slice comprises multiple first-slice resources 101, 110, 120, 130 and the second network slice comprises multiple second-slice resources 201, 210, 220, 230. A further part of the communication network is a control unit 300 for controlling data flow in the first network slice 100, in the second network slice 200 and between the first network slice 100 and the second network slice 200.

The communication network is configured to execute the following steps: In a first step, a template data set including a routing cost indication for a first second-slice resource 220 is provided to the control unit 300. Then, in a second step, subsequent to the first step, it is determined if the routing cost indication of the first second-slice resource 220 complies with a predefined routing requirement of the second network slice 200, and, if the routing cost indication of the first second-slice resource 220 is found to be non-compliant a first-slice resource 120 is determined and network traffic is routed from a second second-slice resource 210 via the first-slice resource 120 to a third second-slice resource 230. The second step is preferably executed by the control unit 300.

The template data set may include routing cost indications of further resources, namely further first-slice resources 101, 110, 120, 130 and/or further second-slice resources 201, 220, 230. The template data set is preferably provided by a mobile edge cloud server 400 arranged at a base station 500 of the communication network or in proximity of the base station 500 of the communication network. The routing cost indication may be based on measurements or statistical data determined by the mobile edge cloud server 400. Preferably, the routing cost indication is determined by measurements carried out prior to the first step. Optionally, the template data set may be stored in a database that is part of the control unit 300.

The routing cost indication provided with the template data set is preferably one of a load indication, a congestion indication, a drop rate indication, a latency indication, a bandwidth indication or a maximum transmission unit indication. Alternatively, the routing cost indication is a combination of two or more of a load indication, a congestion indication, a drop rate indication, a latency indication, a bandwidth indication or a maximum transmission unit indication.

The cost indication may be a constant. However, the routing cost indication may be provided as a function of the date and/or as a function of the day time. Another possibility is to provide, in the first step, a date indication and/or daytime indication to the control unit in addition to the routing cost indication. Preferably, the date indication and/or daytime indication relate to the date or daytime the routing cost indication is associated with. For example a high traffic situation may have been measured for a given day of a specific year. By providing the routing cost indication as a function of date and day time it is possible to use the measurements in order to enhance routing at the same day one or several years later. Thereby, historical traffic data can be used to improve routing in the communication network.

The template data set may further include a detour resource indication indicating a first-slice resource as detour around the second-slice resource. Thus, the detour resource indication may be a first-slice resource indication and, in the second step, the first-slice resource indication is employed to determine the first-slice resource as detour for the first second-slice resource. Optionally, the template data set may include several detour resource indications so that, in the second step, the first-slice resource is chosen from by selecting one of the indicated detour resources.

Alternatively or additionally, the control unit 300 is provided access to the information which resources are included in each of the network slices and what capabilities they have. The control unit may determine a first-slice resource as detour or replacement for the first second-slice resource which has similar, preferably identical, capabilities.

In the foregoing description a communication network has been disclosed that includes a first network slice 100, wherein the first network slice comprises multiple first-slice resources 101, 110, 120, 130, a second network slice 200, wherein the second network slice comprises multiple second-slice resources 201, 210, 220, 230, and a control unit 300 for controlling data flow in the first network slice 100, in the second network slice 200 and between the first network slice 100 and the second network slice 200. The communication network implements a routing method comprising the following steps:

in a first step, a template data set including a routing cost indication for a first second-slice resource 220 is provided to the control unit 300, in a second step, subsequent to the first step, it is determined if the routing cost indication of the first second-slice resource 220 complies with a predefined routing requirement of the second network slice 200, and, if the routing cost indication of the first second-slice resource 220 is found to be non-compliant a first-slice resource 120 is determined and network traffic is routed from a second second-slice resource 210 via the first-slice resource 120 to a third second-slice resource 230. Thereby, the routing performance of the communication network is improved.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for routing in a communication network, the communication network including: a) a first network slice, wherein the first network slice comprises multiple first-slice resources; b) a second network slice, wherein the second network slice comprises multiple second-slice resources; and c) a control unit for controlling data flow in the first network slice, in the second network slice and between the first network slice and the second network slice; wherein the method comprises the following steps:

in a first step, providing a template data set including a routing cost indication for a first second-slice resource to the control unit; and in a second step, subsequent to the first step, determining if the routing cost indication of the first second-slice resource complies with a predefined routing requirement of the second network slice, and, if the routing cost indication of the first second-slice resource is found to be non-compliant, determining a first-slice resource and routing network traffic from a second second-slice resource via the first-slice resource to a third second-slice resource.

2. The method according to claim 1, wherein the routing cost indication is a load indication, a congestion indication, a drop rate indication, a latency indication, a bandwidth indication, or a maximum transmission unit indication.

3. The method according to claim 1, wherein the routing cost indication is determined by measurements prior to the first step.

4. The method according to claim 1, wherein the provided routing cost indication is provided as a function of the date and/or as a function of the day time.

5. The method according to claim 1, wherein the routing cost indication is provided by a mobile edge cloud server arranged at a base station of the communication network or in proximity of a base station of the communication network.

6. The method according to claim 1, wherein, in the first step, the template data set is further provided with a first-slice resource indication and, in the second step, the first-slice resource indication is employed to determine the first-slice resource as the detour for the first second-slice resource.

7. The method according to claim 1, wherein the first-slice resources of the first network slice and/or the second-slice resources of the second network slice are servers or switches.

8. A communication network, comprising:
- a first network slice, wherein the first network slice comprises multiple first-slice resources;
- a second network slice, wherein the second network slice comprises multiple second-slice resources; and
- a control unit for controlling data flow in the first network slice, in the second network slice, and between the first network slice and the second network slice;

wherein the control unit is configured to:
- receive a template data set including a routing cost indication for a first second-slice resource;
- determine if the routing cost indication of the first second-slice resource complies with a predefined routing requirement of the second network slice, and, if the routing cost indication of the first second-slice resource is found to be non-compliant, determine a first-slice resource and route network traffic from a second second-slice resource via the first-slice resource to a third second-slice resource.

9. A non-transitory computer-readable medium having processor-executable instructions for routing in a communication network, the communication network including: a first network slice, wherein the first network slice comprises multiple first-slice resources; a second network slice, wherein the second network slice comprises multiple second-slice resources; and a control unit for controlling data flow in the first network slice, in the second network slice and between the first network slice and the second network slice; wherein the processor-executable instructions, when executed, facilitate the following steps:
- in a first step, providing a template data set including a routing cost indication for a first second-slice resource to the control unit; and
- in a second step, subsequent to the first step, determining if the routing cost indication of the first second-slice resource complies with a predefined routing requirement of the second network slice, and, if the routing cost indication of the first second-slice resource is found to be non-compliant, determining a first-slice resource and routing network traffic from a second second-slice resource via the first-slice resource to a third second-slice resource.

* * * * *